US012608508B2

(12) United States Patent
Hoang

(10) Patent No.: US 12,608,508 B2
(45) Date of Patent: Apr. 21, 2026

(54) FAULT-INJECTION PROTECTION CIRCUIT FOR PROTECTING AGAINST LASER FAULT INJECTION

(71) Applicant: eMemory Technology Inc., Hsin-Chu (TW)

(72) Inventor: Dung Le Tan Hoang, Hsinchu County (TW)

(73) Assignee: eMemory Technology Inc., Hsin-Chu (TW)

( * ) Notice: Subject to any disclaimer, the term of this patent is extended or adjusted under 35 U.S.C. 154(b) by 328 days.

(21) Appl. No.: 18/243,683

(22) Filed: Sep. 8, 2023

(65) Prior Publication Data

US 2024/0095411 A1      Mar. 21, 2024

Related U.S. Application Data

(60) Provisional application No. 63/408,462, filed on Sep. 20, 2022.

(51) Int. Cl.
G06F 21/75 (2013.01)
G06F 21/55 (2013.01)
H03K 19/20 (2006.01)

(52) U.S. Cl.
CPC .......... G06F 21/755 (2017.08); G06F 21/554 (2013.01); H03K 19/20 (2013.01); G06F 2221/034 (2013.01)

(58) Field of Classification Search
CPC ................. G06F 21/755; G06F 21/554; G06F 2221/034; H03K 19/20
See application file for complete search history.

(56) References Cited

U.S. PATENT DOCUMENTS

| | | | |
|---|---|---|---|
| 9,523,736 B2 | 12/2016 | Hershman | |
| 2021/0048466 A1 | 2/2021 | Xue | |
| 2021/0328761 A1 | 10/2021 | Guilley | |
| 2022/0045021 A1* | 2/2022 | Xue | G06F 21/75 |
| 2023/0129830 A1* | 4/2023 | Ghetie | G06F 21/74 |
| | | | 726/23 |

FOREIGN PATENT DOCUMENTS

CN          212749837 U          3/2021

OTHER PUBLICATIONS

Mahmood Javed Azhar, "Duty-Cycle Based Physical Unclonable Functions (PUFs) for Hardware Security Applications", published on Oct. 29, 2018, pp. 1-100.*

* cited by examiner

*Primary Examiner* — Baotran N To
(74) *Attorney, Agent, or Firm* — Winston Hsu

(57) ABSTRACT
A fault-injection protection circuit includes a circuit under protection and a detection circuit. The detection circuit includes a detection cell having unequal pull-up capability and pull-down capability, and is arranged at a distance less than a laser spot diameter from the circuit under protection. The detection circuit is used to generate an alarm signal upon detecting a laser fault injection.

17 Claims, 10 Drawing Sheets

FAULT-INJECTION PROTECTION CIRCUIT FOR PROTECTING AGAINST LASER FAULT INJECTION

CROSS REFERENCE TO RELATED APPLICATIONS

This application claims the benefit of U.S. Provisional Application No. 63/408,462, filed on Sep. 20, 2022. The content of the application is incorporated herein by reference.

BACKGROUND OF THE INVENTION

1. Field of the Invention

The invention relates to data security, and in particular, to a fault-injection protection circuit for protecting against laser fault injection.

2. Description of the Prior Art

A laser fault injection attack is a semi-invasive attack technique in which a pulsed laser is used to target laser pulses to an integrated circuit, resulting in incorrect timing or abnormal data flipping of the integrated circuit, degrading data security and affecting operations.

SUMMARY OF THE INVENTION

According to an embodiment of the invention, a fault-injection protection circuit includes a circuit under protection and a detection circuit. The detection circuit includes a detection cell having unequal pull-up capability and pull-down capability, and arranged at a distance less than a laser spot diameter from the circuit under protection. The detection circuit is used to disable the circuit under protection upon detecting a laser fault injection.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
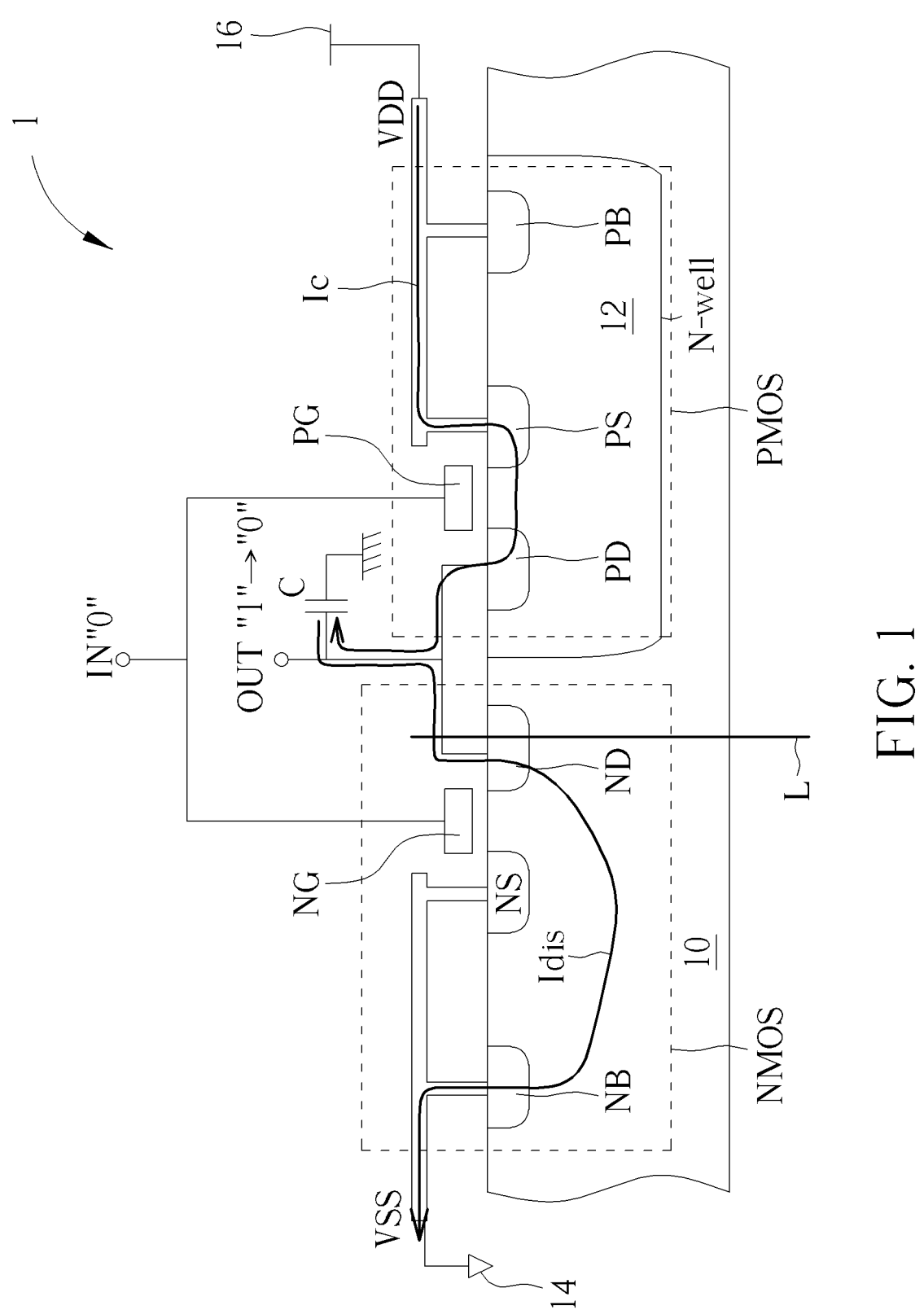
FIG. 1 is a schematic diagram of applying a laser fault injection to a complementary metal-oxide-semiconductor (CMOS) inverter.

FIG. 1 is a schematic diagram of applying a laser fault injection (LFI) to a complementary metal-oxide-semiconductor (CMOS) inverter 1. The CMOS inverter 1 may receive input signal IN and generate output signal OUT.

The CMOS inverter 1 includes an N-type metal-oxide-semiconductor field-effect transistor (MOSFET) NMOS, a P-type MOSFET PMOS, and a parasitic capacitor C. The N-type MOSFET NMOS include a gate terminal NG, a drain terminal ND, a source terminal NS, and a body terminal NB coupled to the source terminal NS and a ground terminal 14 to receive a ground voltage VSS. The P-type MOSFET PMOS include a gate terminal PG coupled to the gate terminal NG, a drain terminal PD coupled to the drain terminal ND, a source terminal PS, and a body terminal PB coupled to the source terminal PS and a supply terminal 16 to receive a supply voltage VDD. The supply voltage VDD is higher than the ground voltage VSS, e.g., the supply voltage VDD is 3.3V and the ground voltage VSS is 0V. The N-type MOSFET NMOS may be disposed on a P-type substrate 10. The P-type MOSFET PMOS may be disposed on an N-type substrate 12 within the N well.

The gate terminals NG and PG may receive the input signal IN, and the drain terminals ND and PD may output the output signal OUT to the parasitic capacitor C. The output signal OUT may be the inverse of the input signal IN. For example, if the input signal IN is a logical level "0", the N-type MOSFET NMOS will be turned off and the P-type MOSFET PMOS will be turned on, and thus, the supply voltage VDD may be used to charge the parasitic capacitor C using a charging current Ic, resulting in an output signal OUT at a logical level "1".

During an LFI attack, a laser pulse L may be injected into the P-type substrate 10 to induce an injected current, and a leakage path is formed from the drain terminal ND to the ground terminal 14, thereby discharging the parasitic capacitor C using a discharging current Idis, The magnitude of the discharging current Idis induced by the laser pulse L may be significantly higher than that of the charging current Ic flowing through the P-type MOSFET PMOS, e.g., the discharging current Idis may be 100 microamperes (uA), and the charging current Ic may be only a few uA, and consequently, the output signal OUT will be flipped from the logical level "1" to the logical level "0".

Similarly, if the parasitic capacitor C hold the logic level "0", in another LFI attack, the laser pulse L may be injected into the N-type substrate 12 to form a leakage path from the drain terminal PD to the supply terminal 16 for charging the parasitic capacitor C, flipping the output signal OUT from the logical level "0" to the logical level "1". Consequently, an unauthorized user may access secure data using the LFI attack.

Figure 2:
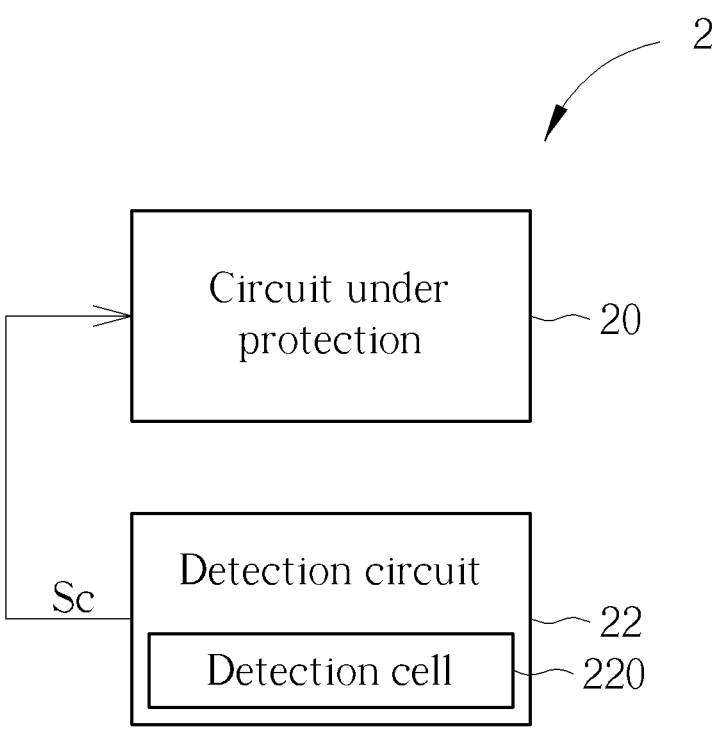
FIG. 2 is a block diagram of a fault-injection protection circuit according to an embodiment of the invention.

FIG. 2 is a block diagram of a fault-injection protection circuit 2 according to an embodiment of the invention. The fault-injection protection circuit 2 may enhance the robustness of a sensitive circuit against an LFI attack.

The fault-injection protection circuit 2 may include a circuit under protection 20 and a detection circuit 22. The detection circuit 22 may include a detection cell 220. The detection cell 220 has unequal pull-up capability and pull-down capability, and is arranged at a distance less than a laser spot diameter from the circuit under protection 20. For example, the laser spot diameter may be 1.5 micrometers (um), and the detection cell 220 may be arranged at a distance less than 1.5 um from the circuit under protection 20. In some embodiments, the pull-up capability of the detection cell 220 may exceed the pull-down capability of the detection cell 220, and may be twice or more of the pull-down capability of the detection cell 220. For example, the pull-up capability of the detection cell 220 may be six times of the pull-down capability of the detection cell 220. The detection cell 220 is much more sensitive to an LFI than a normal cell such as the CMOS inverter 1, and may flip the output thereof to the logical level "1" much faster than the normal cell. In such a case, the detection cell 220 may be referred to as a PDET detection cell. The PDET detection may be used to detect an LFI in the N-type substrate.

In other embodiments, the pull-up capability of the detection cell 220 may be less than the pull-down capability of the detection cell 220, and may be half or less of the pull-down capability of the detection cell 220. For example, the pull-up capability of the detection cell 220 may be one-sixth of the pull-down capability of the detection cell 220. The detection cell 220 is much more sensitive to an LFI than the normal cell, and may flip the output thereof to the logical level "0" much faster than the normal cell. In such a case, the detection cell 220 may be referred to as an NDET detection cell. The NDET detection may be used to detect an LFI in the P-type substrate.

Since the detection cell 220 may respond to the LFI much faster than the normal cell, the detection circuit 22 may generate an alarm signal upon detecting the LFI, and the detection circuit 22 may further disable the circuit under protection 20 using a control signal Sc upon detecting the LFI, protecting the secure data in the circuit under protection 20 from being accessed by the unauthorized user.

Figure 3:
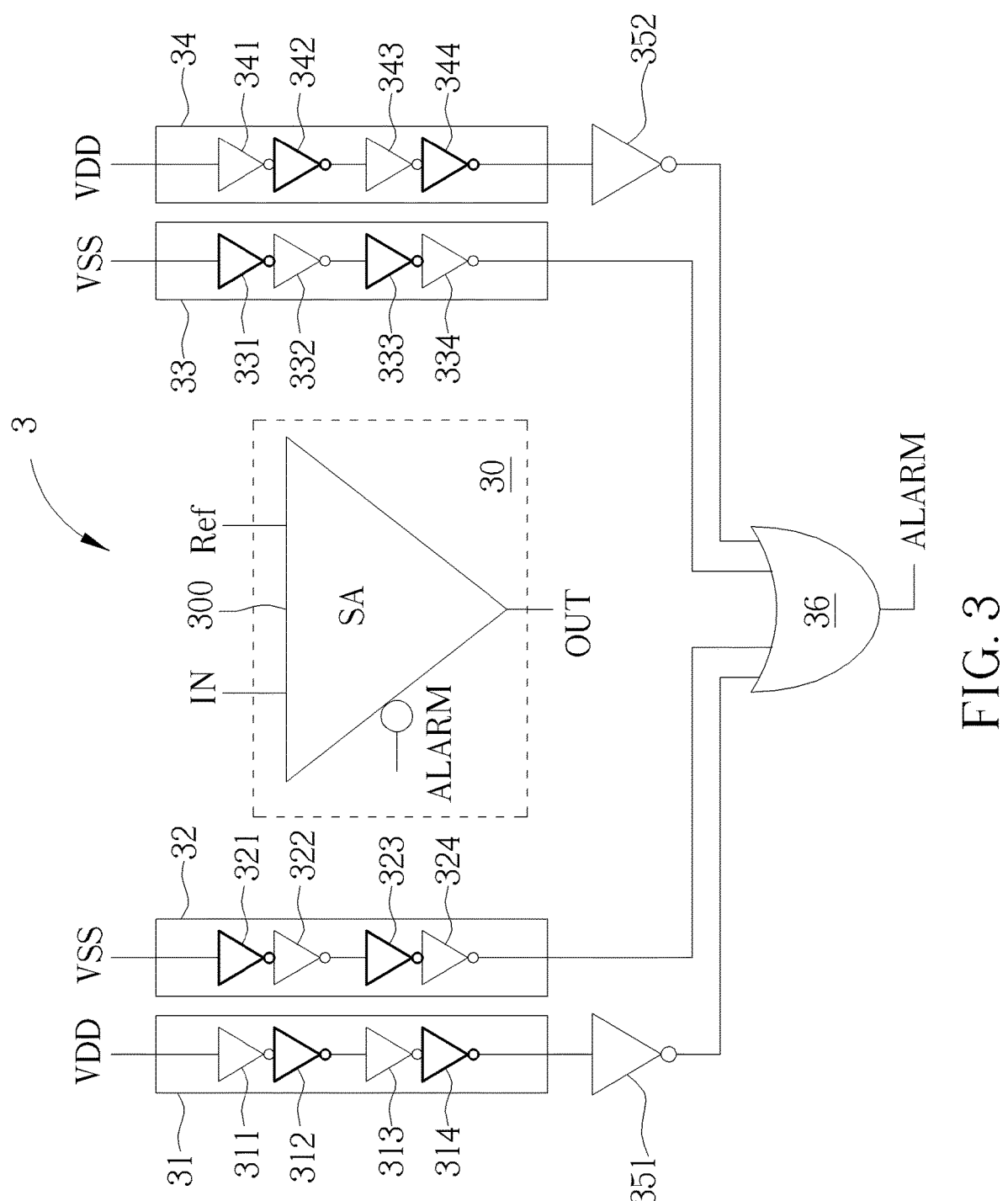
FIG. 3 is a circuit schematic of a fault-injection protection circuit according to another embodiment of the invention.

FIG. 3 is a circuit schematic of a fault-injection protection circuit 3 according to another embodiment of the invention. The fault-injection protection circuit 3 may include a circuit under protection 30, detection circuits 31 to 34, inverters 351 and 352, and an OR gate 36. The circuit under protection 30 may include a sense amplifier (SA) 300. The detection circuit 31 may be coupled to the inverter 351, and the detection circuit 34 may be coupled to the inverter 352. The inverter 351, the detection circuit 32, the detection circuit 33, and the inverter 351 may be coupled to the OR gate 36, and the OR gate 36 may be coupled to the sense amplifier 300.

The sense amplifier 300 may receive an input signal IN and a reference signal Ref, and generate an output signal OUT according to the input signal IN and the reference signal REF. In the embodiment, the input signal IN, the reference signal Ref, and the output signal OUT may be current signals. In other embodiments, the input signal IN, the reference signal Ref, and the output signal OUT may be voltage signals. In some embodiments, the sense amplifier 300 may include cross-coupled inverters, each receiving one of input signal IN and the reference signal Ref to generate the output signal OUT according to a difference between the input signal IN and the reference signal Ref. Further, the sense amplifier 300 may include a latch to hold the data in the output signal OUT.

The detection circuits 31 to 34 may be arranged at distances less than the laser spot diameter from the sense amplifier 300. In the embodiment, the detection circuits 31 and 32 may be arranged at the left of the sense amplifier 300, and the detection circuits 33 and 34 may be arranged at the right of the sense amplifier 300 to detect an LFI on the outputs of cross-coupled inverters and/or the input/output of the latch. Upon detecting the LFI, the OR gate 36 may generate an alarm signal ALARM to disable the sense amplifier 300, preventing the output signal OUT from being affected by the LFI. Conversely, if no LFI is detected, the sense amplifier 300 may be enabled to generate the output signal OUT and latch the data in the output signal OUT.

The detection circuit 31 may include a PDET detection cell 311, an NDET detection cell 312, a PDET detection cell 313, and an NDET detection cell 314, each having unequal pull-up capability and pull-down capability and arranged at a distance less than the laser spot diameter from the sense amplifier 300. In FIG. 3, the thin-line triangles may indicate the PDET detection cells, and the bold triangles may indicate the NDET detection cells. The PDET detection cell 311 includes an input terminal configured to receive the supply voltage VDD, and an output terminal. The NDET detection cell 312 includes an input terminal coupled to the output terminal of the PDET detection cell 311, and an output terminal. The PDET detection cell 313 includes an input terminal coupled to the output terminal of the NDET detection cell 312, and an output terminal. The NDET detection cell 314 includes an input terminal coupled to the output terminal of the PDET detection cell 313, and an output terminal. The inverter 351 includes an input terminal coupled to the output terminal of the NDET detection cell 314, and an output terminal. If no LFI is detected by the PDET detection cell 311, the NDET detection cell 312, the PDET detection cell 313, and the NDET detection cell 314, the output terminal of the inverter 351 will output the ground voltage VSS (i.e., the logical level "0"). Conversely, if any of the PDET detection cell 311, the NDET detection cell 312, the PDET detection cell 313, and the NDET detection cell 314 detects the LFI, the voltage at the output terminal of the inverter 351 will be flipped to the supply voltage VDD (i.e., the logical level "1").

The detection circuit 32 may include an NDET detection cell 321, a PDET detection cell 322, an NDET detection cell 323, and a PDET detection cell 324, each having unequal pull-up capability and pull-down capability and arranged at a distance less than the laser spot diameter from the sense amplifier 300. The NDET detection cell 321 includes an input terminal configured to receive the ground voltage VSS, and an output terminal. The PDET detection cell 322 includes an input terminal coupled to the output terminal of the NDET detection cell 321, and an output terminal. The NDET detection cell 323 includes an input terminal coupled to the output terminal of the PDET detection cell 322, and an output terminal. The PDET detection cell 324 includes an input terminal coupled to the output terminal of the NDET detection cell 323, and an output terminal. If no LFI is detected by the NDET detection cell 321, the PDET detection cell 322, the NDET detection cell 323, and the PDET detection cell 324, the output terminal of the PDET detection cell 324 will output the ground voltage VSS (i.e., the logical level "0"). Conversely, if any of the NDET detection cell 321, the PDET detection cell 322, the NDET detection cell 323, and the PDET detection cell 324 detects the LFI, the voltage at the output terminal of the PDET detection cell 324 will be flipped to the supply voltage VDD (i.e., the logical level "1").

The detection circuit 33 may include an NDET detection cell 331, a PDET detection cell 332, an NDET detection cell 333, and a PDET detection cell 334, each having unequal pull-up capability and pull-down capability and arranged at a distance less than the laser spot diameter from the sense amplifier 300. The NDET detection cell 331 includes an input terminal configured to receive the ground voltage VSS, and an output terminal. The PDET detection cell 332 includes an input terminal coupled to the output terminal of the NDET detection cell 331, and an output terminal. The NDET detection cell 333 includes an input terminal coupled to the output terminal of the PDET detection cell 332, and an output terminal. The PDET detection cell 334 includes an input terminal coupled to the output terminal of the NDET detection cell 333, and an output terminal. If no LFI is detected by the NDET detection cell 331, the PDET detection cell 332, the NDET detection cell 333, and the PDET detection cell 334, the output terminal of the PDET detection cell 334 will output the ground voltage VSS (i.e., the logical level "0"). Conversely, if any of the NDET detection cell 331, the PDET detection cell 332, the NDET detection cell 333, and the PDET detection cell 334 detects the LFI, the voltage at the output terminal of the PDET detection cell 334 will be flipped to the supply voltage VDD (i.e., the logical level "1").

The detection circuit 34 may include a PDET detection cell 341, an NDET detection cell 342, a PDET detection cell 343, and an NDET detection cell 344, each having unequal pull-up capability and pull-down capability and arranged at a distance less than the laser spot diameter from the sense amplifier 300. The PDET detection cell 341 includes an input terminal configured to receive the supply voltage VDD, and an output terminal. The NDET detection cell 342 includes an input terminal coupled to the output terminal of the PDET detection cell 341, and an output terminal. The PDET detection cell 343 includes an input terminal coupled to the output terminal of the NDET detection cell 342, and an output terminal. The NDET detection cell 344 includes an input terminal coupled to the output terminal of the PDET detection cell 343, and an output terminal. The inverter 351 includes an input terminal coupled to the output terminal of the NDET detection cell 344, and an output terminal. If no LFI is detected by the PDET detection cell 341, the NDET detection cell 342, the PDET detection cell 343, and the NDET detection cell 344, the output terminal of the inverter 352 will output the ground voltage VSS (i.e., the logical level "0"). Conversely, if any of the PDET detection cell 341, the NDET detection cell 342, the PDET detection cell 343, and the NDET detection cell 344 detects the LFI, the voltage at the output terminal of the inverter 352 will be flipped to the supply voltage VDD (i.e., the logical level "1").

The OR gate 36 includes a first input terminal coupled to the output terminal of the inverter 351, a second input terminal coupled to the output terminal of the detection cell 324, a third input terminal coupled to the output terminal of the detection cell 334, a fourth input terminal coupled to the output terminal of the inverter 352, and an output terminal coupled to a control terminal of the sense amplifier 300. That is, if no LFI is detected, the voltage at the input terminals of the OR gate 36 will be ground voltage VSS and thus the output terminal of the OR gate 36 will output the ground voltage VSS (i.e., the logical level "0") in the alarm signal ALARM, enabling the operations of the sense amplifier 300; and if the LFI is detected, the voltage at one of the input terminals of the OR gate 36 will be supply voltage VDD and thus the output terminal of the OR gate 36 will output the supply voltage VDD (i.e., the logical level "1") in the alarm signal ALARM, disabling the operations of the sense amplifier 300.

Accordingly, the pull-up capabilities of the PDET detection cells 311, 313, 322, 324, 332, 334, 341, and 343 may exceed the corresponding pull-down capabilities of the PDET detection cells 311, 313, 322, 324, 332, 334, 341, and 343. The pull-up capabilities of the NDET detection cells

312, 314, 321, 323, 331, 333, 342, and 344 may be less than the corresponding pull-down capabilities of the NDET detection cells 312, 314, 321, 323, 331, 333, 342, and 344.

Figure 4:
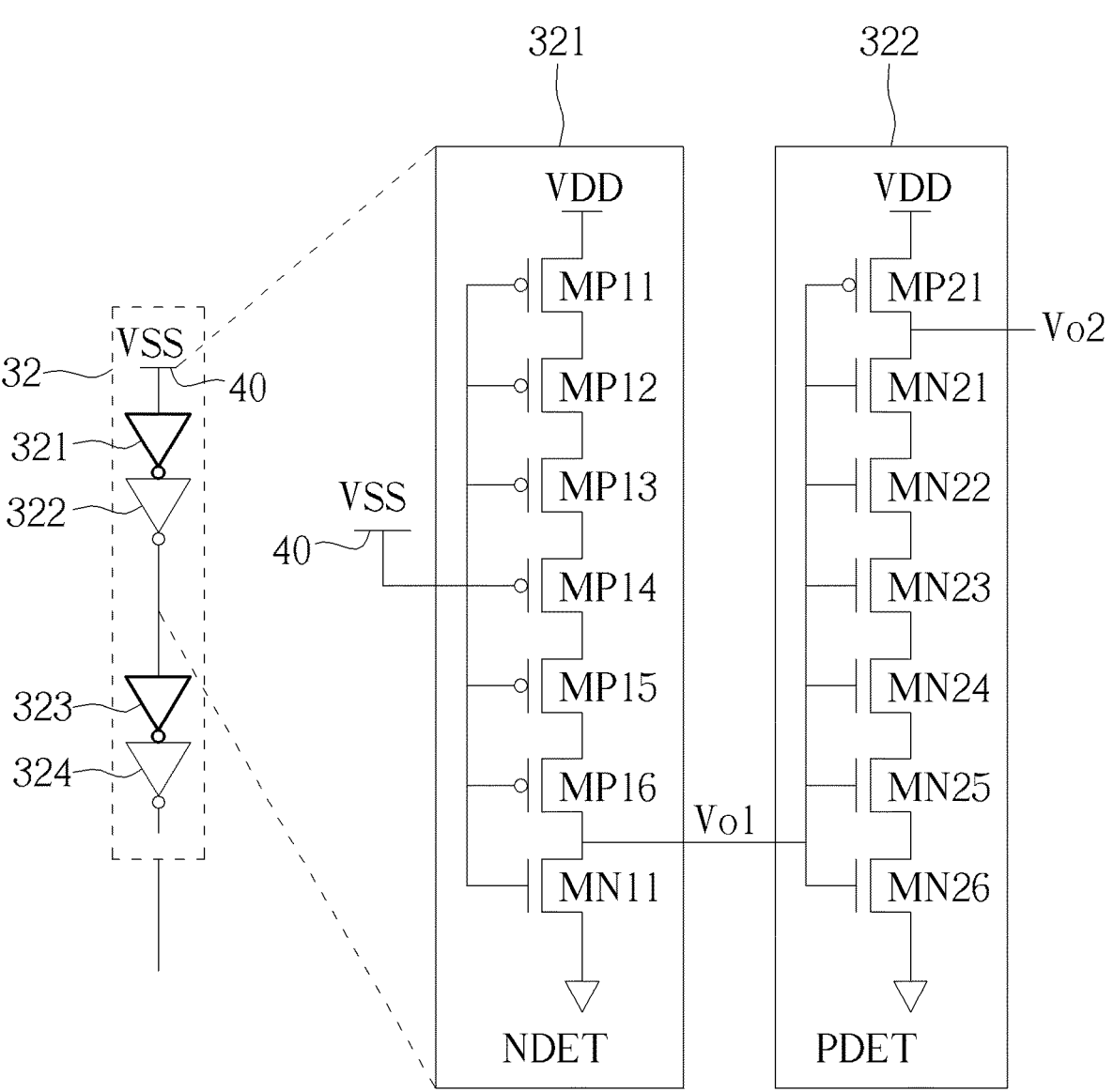
FIG. 4 shows a circuit schematic of the detection circuit in FIG. 3.

FIG. 4 shows a circuit schematic of the detection circuit 32. The following discussion will be focused on the NDET detection cell 321 and PDET detection cell 322.

The NDET detection cell 321 may include stacked P-type transistors MP11 to MP16 and an N-type transistor MN11. The stacked P-type transistors MP11 to MP16 include a plurality of control terminals configured to receive the ground voltage VSS, a first terminal configured to receive the supply voltage VDD, and a second terminal. The N-type transistor MN11 includes a control terminal coupled to the plurality of control terminals of the stacked P-type transistors MP11 to MP16, a first terminal coupled to the second terminal of the stacked P-type transistors MP11 to MP16, and a second terminal configured to receive the ground voltage VSS. If the width/length ratios of the P-type transistors MP11 to MP16 and the N-type transistor MN11 are equal, the equivalent width/length ratio of the stacked P-type transistors MP11 to MP16 will be one sixth of the width/length ratio of the N-type transistor MN11, and therefore, the pull-up capability of the NDET detection cell 321 will be less than the pull-down capability of the NDET detection cell 321. The control terminal of the N-type transistor MN11 and the plurality of control terminals of the stacked P-type transistors MP11 to MP16 may be coupled to the ground terminal 40 to receive the ground voltage VSS, and consequently, the second terminal of the stacked P-type transistors MP11 to MP16 may generate an output voltage Vo1 at the supply voltage VDD if no fault is injected. If, however, a fault is injected into the P-type substrate of the N-type transistor MN11, since the pull-up capability of the NDET detection cell 321 is weak in comparison to the injected current induced by the LFI, the output voltage Vo1 will be quickly flipped to the ground voltage VSS.

The PDET detection cell 322 may include a P-type transistor MP21 and stacked N-type transistors MN21 to MN26. The P-type transistor MP21 includes a control terminal, a first terminal configured to receive the supply voltage VDD, and a second terminal. The stacked N-type transistors MN21 to MN26 include a plurality of control terminals coupled to the control terminal of the P-type transistor MP21, a first terminal coupled to the second terminal of the P-type transistor MP21, and a second terminal configured to receive the ground voltage VSS. If the width/length ratio of the P-type transistor MP21 and the each width/length ratio of the stacked N-type transistors MN21 to MN26 are equal, the equivalent width/length ratio of the P-type transistor MP21 will be six times of the equivalent width/length ratio of the stacked N-type transistors MN21 to MN26, and therefore, the pull-up capability of the PDET detection cell 322 will exceed the pull-down capability of the PDET detection cell 322. The control terminal of the P-type transistor MP21 and the plurality of control terminals of the N-type transistors MN21 to MN26 may receive the output voltage Vo1. For the output voltage Vo1 at the supply voltage VDD, the second terminal of the P-type transistor MP21 may generate an output voltage Vo2 at the ground voltage VSS if no fault is injected. If, however, a fault is injected into the N-type substrate of the P-type transistor MP21, since the pull-down capability of the PDET detection cell 322 is weak in comparison to the injected current induced by the LFI, the output voltage Vo2 will be quickly flipped to the supply voltage VDD.

Figure 5:
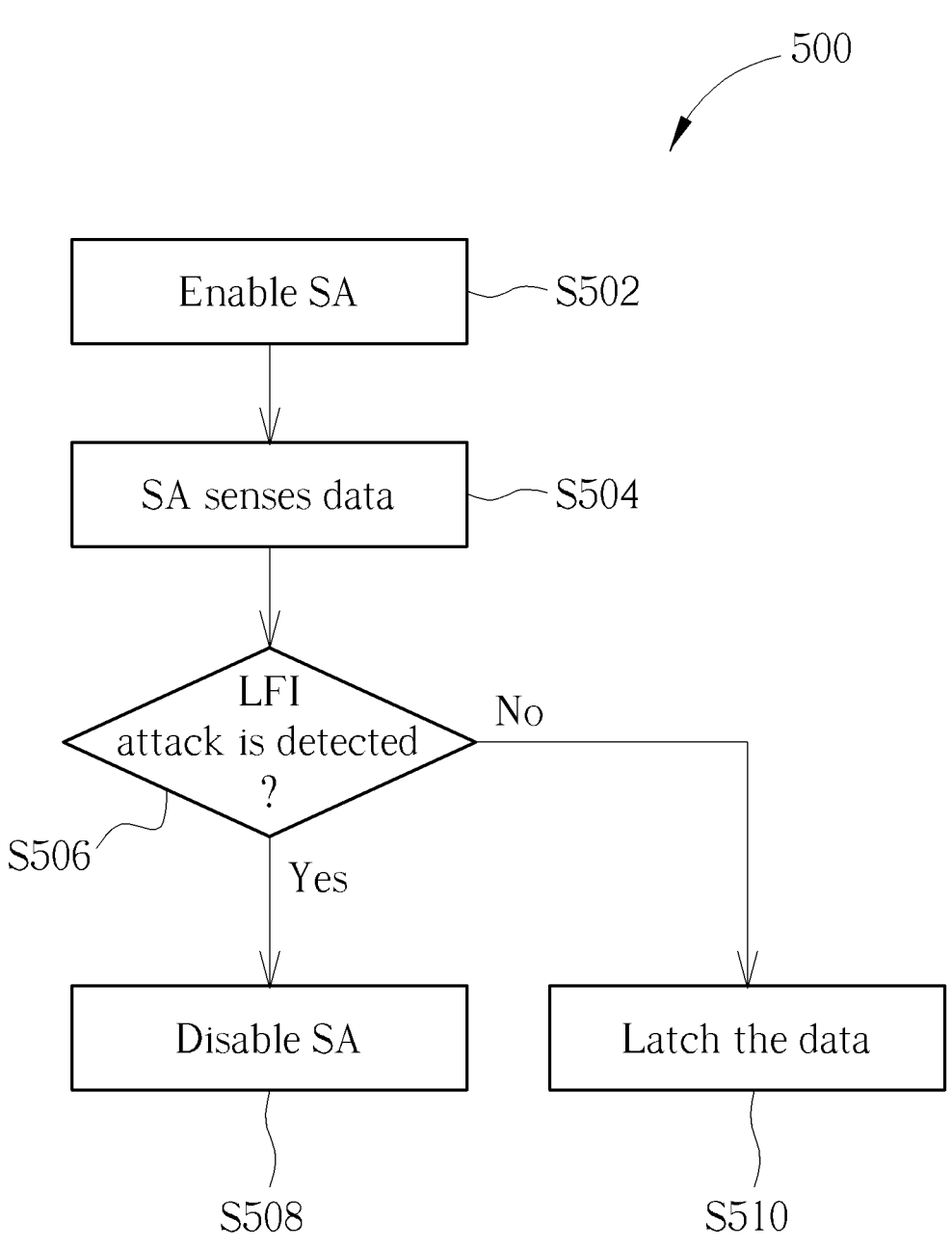
FIG. 5 is a flowchart of a control method of the fault-injection protection circuit in FIG. 2.

FIG. 5 is a flowchart of a control method 500 of the fault-injection protection circuit 3. The control method 500 includes Steps S502 to S510 to control the sense amplifier 300 according to LFI detection. Any reasonable step change or adjustment is within the scope of the present disclosure. Steps S502 to S510 are detailed as follows:

Step S502: Enable the sense amplifier 300;

Step S504: The sense amplifier 300 senses data;

Step S506: The detection circuits 31 to 34 determine whether an LFI attack is detected? If so, go to Step S508; if not, go to Step S510;

Step S508: Disable the sense amplifier 300;

Step S510: The sense amplifier 300 latches the data.

In Step S504, the sense amplifier senses the data in the input signal IN. In Step S506, if the LFI attack is detected, the OR gate 36 sets the alarm signal ALARM to the supply voltage VDD. If no LFI attack is detected, the OR gate 36 sets the alarm signal ALARM to the ground voltage VSS. In Step S508, the sense amplifier 300 is disabled by the alarm signal ALARM to stop sensing the data. In Step S510, the sense amplifier 300 is enabled to latch the sensed data.

Figure 6:
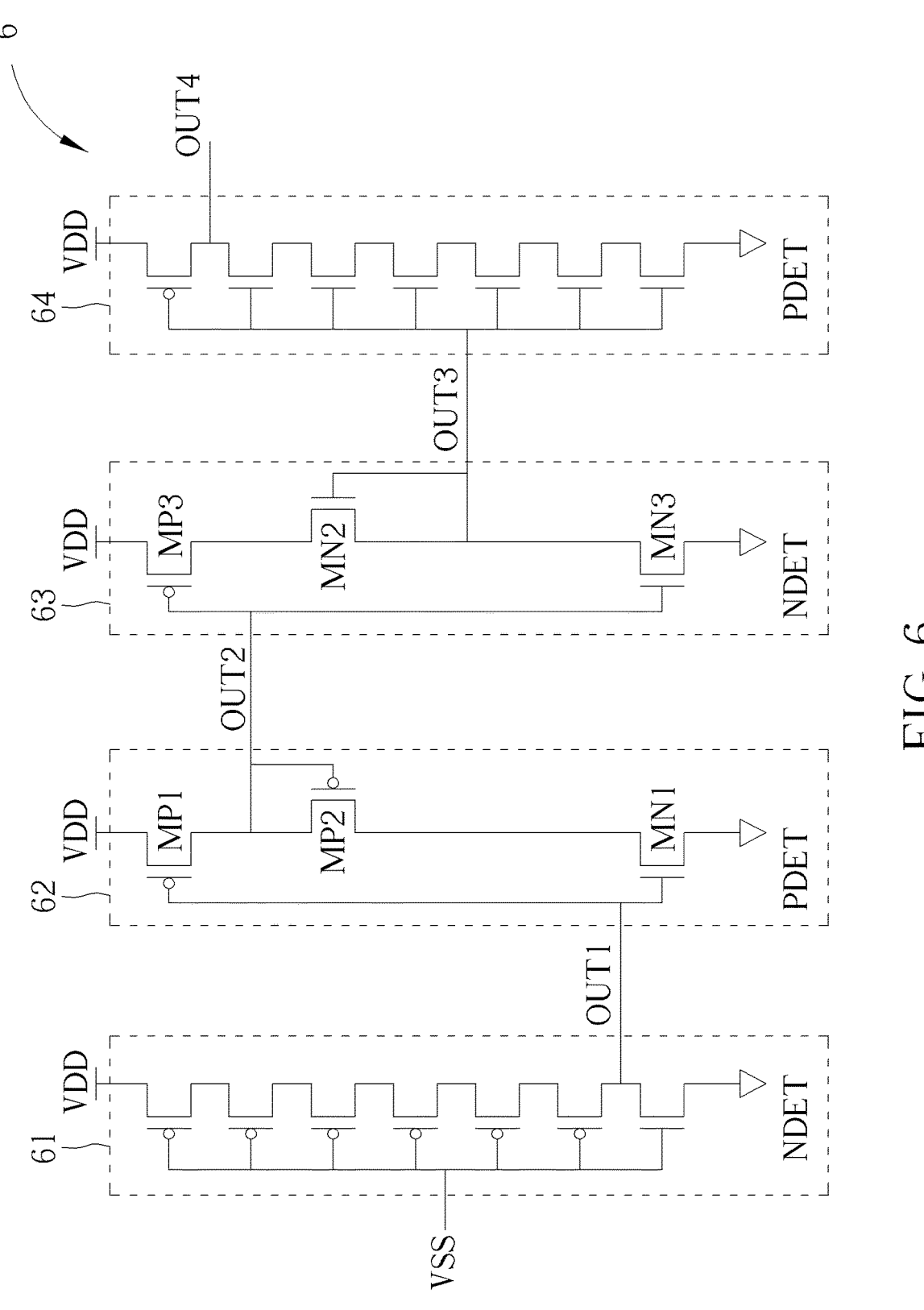
FIG. 6 shows a circuit schematic of the detection circuit according to another embodiment of the invention.

FIG. 6 shows a circuit schematic of a detection circuit 6 according to another embodiment of the invention. The detection circuit 6 may be employed as the detection circuit 220 in FIG. 2 or the detection circuits 31 to 34 in FIG. 3. The detection circuit 6 may include NDET detection cells 61 and 63, and PDET detection cells 62 and 64. The NDET detection cells 61 may receive the ground voltage VSS and output a voltage OUT1, the PDET detection cells 62 may receive the voltage OUT1 and output a voltage OUT2, the NDET detection cells 63 may receive the voltage OUT2 and output a voltage OUT3, and the PDET detection cells 62 may receive the voltage OUT3 and output a voltage OUT4.

The NDET detection cell 61, the PDET detection cell 62, the NDET detection cell 63, and the PDET detection cell 64 are sequentially coupled to each other. The configurations and operations of the NDET detection cell 61 are similar to the NDET detection cell 321, the configurations and operations of the PDET detection cell 64 are similar to the PDET detection cell 322, and the explanation therefor can be found in the preceding paragraphs and will not be repeated here for brevity. In some embodiments, the control terminal and the second terminal of the NMOS in the NDET detection cell 61 can be coupled together.

The PDET detection cell 62 may include P-type transistors MP1 and MP2 and an N-type transistor MN1. The P-type transistor MP1 includes a control terminal, a first terminal configured to receive the supply voltage VDD, and a second terminal. The P-type transistor MP2 includes a control terminal, a first terminal coupled to the second terminal of the P-type transistor MP1 and the control terminal of the P-type transistor MP2, and a second terminal. The N-type transistor MN1 includes a control terminal coupled to the control terminal of the P-type transistor MP1, a first terminal coupled to the second terminal of the P-type transistor MP2, and a second terminal configured to receive the ground voltage VSS. The N-type transistor MN1 and the P-type transistor MP2 may provide weak pull-down capability, and the P-type transistor MP1 may provide strong pull-up capability, thereby flipping the voltage OUT2 to the supply voltage VDD much faster than the normal cell upon an LFI attack.

The NDET detection cell 63 may include a P-type transistor MP3, and N-type transistors MN2 and MN3. The P-type transistor MP3 includes a control terminal, a first terminal configured to receive the supply voltage VDD, and a second terminal. The N-type transistor MN2 includes a control terminal, a first terminal coupled to the second terminal of the P-type transistor MP3, and a second terminal coupled to the control terminal of the N-type transistor MN2. The N-type transistor MN3 includes a control terminal coupled to the control terminal of the P-type transistor MP3, a first terminal coupled to the second terminal of the N-type transistor MN2, and a second terminal configured to receive the ground voltage VSS. The P-type transistor MP3 and the N-type transistor MN2 may provide weak pull-up capability, and the N-type transistor MN3 may provide strong pull-down capability, thereby flipping the voltage OUT3 to the ground voltage VSS much faster than the normal cell upon an LFI attack.

The control terminal of all transistors in the NDET detection cell 61 may receive the ground voltage VSS, and the first terminal of the N-type transistor in the NDET detection cell 61 may generate the voltage OUT1. The control terminal of the P-type transistor MP1 and the control terminal of the N-type transistor MN1 may receive the voltage OUT1, and the second terminal of the P-type transistor MP1 may generate the voltage OUT2. The control terminal of the P-type transistor MP3 and the control terminal of the N-type transistor MN3 may receive the voltage OUT2, and the second terminal of the N-type transistor MN2 may generate the voltage OUT3. The control terminal of all transistors in the PDET detection cell 64 may receive the voltage OUT3, and the second terminal of the P-type transistor in the PDET detection cell 64 may generate the voltage OUT4.

If no fault is injected, since the ground voltage VSS is input to the NDET detection cell 61, the voltage OUT1 may be set to the supply voltage VDD, the voltage OUT2 may be pre-discharged to a low voltage Vthp (e.g., 0.6V) close to the ground voltage VSS, the voltage OUT3 may be pre-charged to a high voltage (VDD−Vthn) (e.g., 2.7V) close to the supply voltage VDD, and the voltage OUT4 may be set to the ground voltage VSS, the voltage Vthp being the threshold voltage of the P-type transistor MP2, and the voltage Vthn being the threshold voltage of the N-type transistor MN2.

However, if a fault is injected into the N-type substrate of the P-type transistor MP1, the voltage OUT2 will be pulled up from the low voltage Vthp to the supply voltage VDD by the injected current flowing through the P-type transistor MP1, the voltage OUT3 will be flipped from the supply voltage VDD to the ground voltage VSS, and the voltage OUT4 will be flipped from the ground voltage VSS to the supply voltage VDD, indicating that a LFI has been detected.

If a fault is injected into the P-type substrate of the N-type transistor MN3, the voltage OUT3 will be pulled down from the high voltage (VDD−Vthn) to the ground voltage VSS by the injected current flowing through the N-type transistor MN3, and the voltage OUT4 will be flipped from the ground voltage VSS to the supply voltage VDD, indicating that a LFI has been detected.

Figure 7:
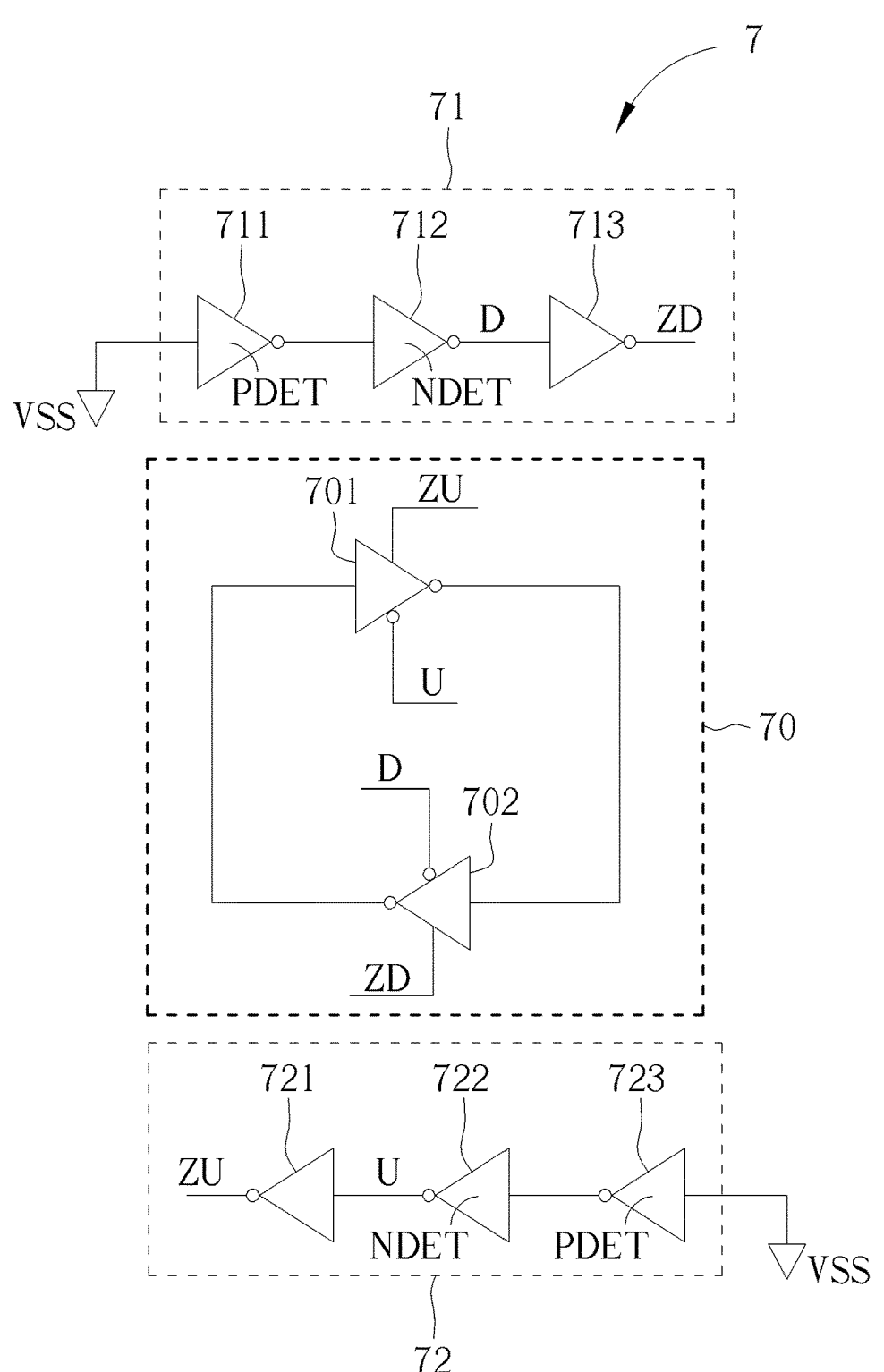
FIG. 7 is a circuit schematic of a fault-injection protection circuit according to another embodiment of the invention.

FIG. 7 is a circuit schematic of a fault-injection protection circuit 7 according to another embodiment of the invention. The fault-injection protection circuit 7 may include a circuit under protection 70 and detection circuits 71 and 72. The circuit under protection 70 may include a latch, the latch including inverters 701 and 702. In some embodiments, the inverters 701 and 702 can be tri-state inverters with at least one enable terminal. The inverter 701 includes an input terminal, an output terminal, a first enable terminal and a second enable terminal for receiving another control signals. The inverter 702 includes an input terminal coupled to the output terminal of the inverter 701, and an output terminal coupled to the input terminal of the inverter 701, a first enable terminal and a second enable terminal for receiving control signals.

The PDET detection cell 711 and the NDET detection cell 712 may be arranged at the distance less than the laser spot diameter from the inverter 701, and may disable the inverter 702 by the control of the enable terminals upon detecting the LFI. The NDET detection cell 722 and the PDET detection cell 723 may be arranged at the distance less than the laser spot diameter from the inverter 702, and may disable the inverter 701 by the control of the enable terminals upon detecting the LFI.

The detection circuit 71 may include a PDET detection cell 711, an NDET detection cell 712, and an inverter 713. The detection circuit 72 may include an inverter 721, an NDET detection cell 722, and a PDET detection cell 723. The PDET detection cell 711 includes an input terminal configured to receive the ground voltage VSS, and an output terminal. The NDET detection cell 712 includes an input terminal coupled to the output terminal of the PDET detection cell 711, and an output terminal coupled to the second enable terminal of the inverter 702 and configured to output a control signal D. The third inverter 713 includes an input terminal coupled to the output terminal of the NDET detection cell 712, and an output terminal coupled to the first enable terminal of the inverter 702 and configured to output a control signal ZD. The PDET detection cell 723 includes an input terminal configured to receive the ground voltage VSS, and an output terminal. The NDET detection cell 722 includes an input terminal coupled to the output terminal of the PDET detection cell 723, and an output terminal coupled to the second enable terminal of the inverter 701 and configured to output a control signal U. The inverter 720 includes an input terminal coupled to the output terminal of the NDET detection cell 722, and an output terminal coupled to the first enable terminal of the inverter 701 and configured to output a control signal ZU.

The pull-up capability of the PDET detection cell 711 exceeds the pull-down capability of the PDET detection cell 711. The pull-up capability of the NDET detection cell 712 is less than the pull-down capability of the NDET detection cell 712. The pull-up capability of the inverter 713 is equal to the pull-down capability of the inverter 713. The pull-up capability of the PDET detection cell 723 exceeds the pull-down capability of the PDET detection cell 723. The pull-up capability of the NDET detection cell 722 is less than the pull-down capability of the NDET detection cell 722. The pull-up capability of the inverter 721 is equal to the pull-down capability of the inverter 721.

If no LFI is detected, the control signal ZD may be set to the supply voltage VDD and the control signal D may be set to the ground voltage VSS to enable the inverter 702 to feed the output data of the inverter 702 to the input terminal of the inverter 701, and the control signal ZU may be set to the supply voltage VDD and the control signal U may be set to the ground voltage VSS to enable the inverter 701 to feed forward the output data of the inverter 701 to the input terminal of the inverter 702, so as to enable the latch to operate normally.

If one of the PDET detection cell 711 and the NDET detection cell 712 detects the LFI, the control signal ZD may be flipped to the ground voltage VSS and the control signal D may be flipped to the supply voltage VDD to disable the inverter 702, preventing the output data of the inverter 702 from being changed, thereby locking the data held in the latch without being effected by the LFI.

Similarly, if one of the PDET detection cell 723 and the NDET detection cell 722 detects the LFI, the control signal ZU may be flipped to the ground voltage VSS and the control signal U may be flipped to the supply voltage VDD to disable the inverter 701, preventing the output data of the inverter 701 from being changed, thereby locking the data held in the latch without being effected by the LFI.

Figure 8:
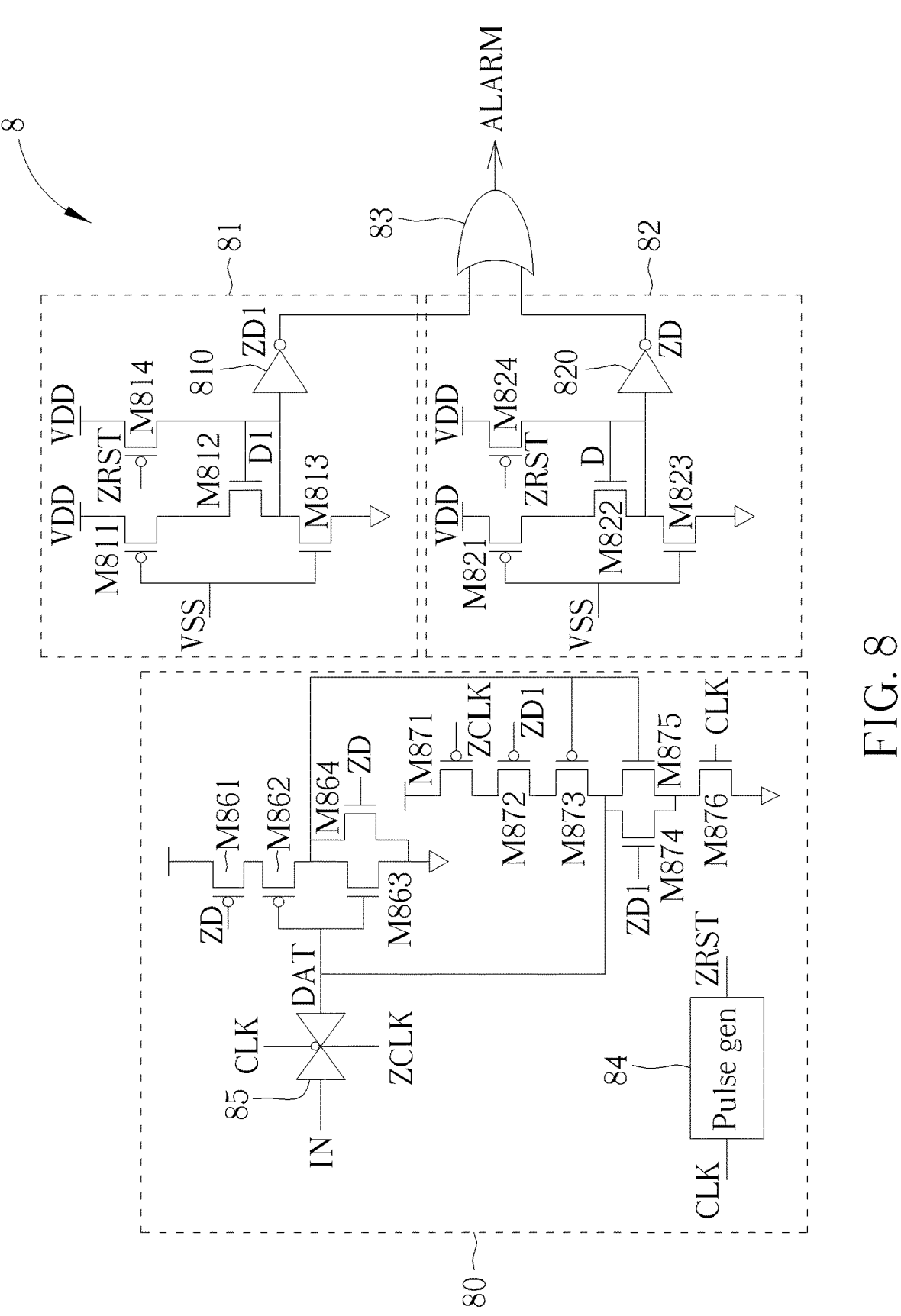
FIG. 8 is a circuit schematic of a fault-injection protection circuit according to another embodiment of the invention.

FIG. 8 is a circuit schematic of a fault-injection protection circuit 8 according to another embodiment of the invention. The fault-injection protection circuit 8 may include a circuit under protection 80 and detection circuits 81 and 82.

The circuit under protection 80 may include a pulse generator 84, a pass gate 85, and a latch, the latch including a first inverter and a second inverter. The first inverter may form a forward path of the latch, and the second inverter may form a feedback path of the latch. The first inverter includes P-type transistors M861 and M862, and N-type transistors M863 and M864. The second inverter includes P-type transistors M871 to M873, and N-type transistors M874 to M865. The pass gate 85 includes an input terminal configured to receive an input signal IN, a first control terminal configured to receive a clock signal CLK, a second control terminal configured to receive an inverted clock signal ZCLK, and an output terminal configured to output a data signal DAT. The inverted clock signal ZCLK may be the inverse of the clock signal CLK.

When the clock signal CLK is set to the logical level "1", the input signal IN passes the pass gate 85 to generate the data signal DAT, and the first inverter may generate an inverted data signal ZDAT while the second inverter is disabled, writing the data in the input signal to the latch. When the clock signal CLK is set to the logical level "0", the input signal IN is blocked by the pass gate 85, the second inverter may be enabled to generate the data signal DAT, and the first inverter may generate the inverted data signal ZDAT by inverting the data signal DAT, maintaining the data in the latch.

The first inverter includes P-type transistors M861 and M862, and N-type transistors M863 and M864. The first inverter may be a tri-state inverter. The P-type transistor M861 includes a control terminal configured to receive a control signal ZD, a first terminal configured to receive the supply voltage VDD, and a second terminal. The P-type transistor M862 includes a control terminal coupled to the output terminal of the pass gate 85 to receive the data signal DAT, a first terminal coupled to the second terminal of the P-type transistor M861, and a second terminal configured to output the inversed data signal ZDAT. The N-type transistor M863 includes a control terminal coupled to the control terminal of the P-type transistor M862, a first terminal coupled to the second terminal of the P-type transistor M862, and a second terminal configured to receive the ground voltage VSS. The N-type transistor M864 includes a control terminal configured to receive the control signal ZD, a first terminal coupled to the first terminal of the N-type transistor M863, and a second terminal coupled to the second terminal of the N-type transistor M863.

The second inverter includes P-type transistors M871 to M873, and N-type transistors M874 to M865. The second inverter may be a tri-state inverter. The P-type transistor M871 includes a control terminal configured to receive the inverted clock signal ZCLK, a first terminal configured to receive the supply voltage VDD, and a second terminal. The P-type transistor M872 includes a control terminal configured to receive a control signal ZD1, a first terminal coupled to the second terminal of the P-type transistor M871, and a second terminal. The P-type transistor M873 includes a control terminal configured to receive the inverted data signal ZDAT, a first terminal coupled to the second terminal of the P-type transistor M872, and a second terminal. The N-type transistor M875 includes a control terminal coupled to the control terminal of the P-type transistor M873 to receive the inverted data signal ZDAT, a first terminal coupled to the second terminal of the P-type transistor M873, and a second terminal. The N-type transistor M874 includes a control terminal to receive the control signal ZD1, a first terminal coupled to the first terminal of the N-type transistor M875, and a second terminal coupled to the second terminal of the N-type transistor M875. The N-type transistor M876 includes a control terminal configured to receive the clock signal CLK, a first terminal coupled to the second terminal of the N-type transistor M875, and a second terminal configured to receive the ground voltage VSS.

The detection circuits 81 may include a first NDET detection cell, the first NDET detection cell including a P-type transistor M811, N-type transistors M812 and M813, a reset transistor M814, and an inverter 810. The P-type transistor M811 includes a control terminal configured to receive the ground voltage VSS, a first terminal configured to receive the supply voltage VDD, and a second terminal. The N-type transistor M812 includes a control terminal configured to receive a control signal D1, a first terminal coupled to the second terminal of the P-type transistor M811, and a second terminal coupled to the control terminal of the N-type transistor M812. The N-type transistor M813 includes a control terminal coupled to the control terminal of the P-type transistor M811, a first terminal coupled to the second terminal of the N-type transistor M812, and a second terminal configured to receive ground voltage VSS, the N-type transistor M813 being arranged at the distance less than the laser spot diameter from the N-type transistor M863. The inverter 810 includes an input terminal coupled to the second terminal of the N-type transistor M812, and an output terminal coupled to the control terminal of the P-type transistor M872 and the control terminal of the N-type transistor M874.

Since the N-type transistor M813 is arranged at the distance less than the laser spot diameter from the N-type transistor M863, any LFI targeting the N-type transistor M863 may be detected by the N-type transistor M813 flipping the control signal D1 prior to N-type transistor M863 flipping the inverted data signal ZDAT. Upon detecting the LFI, the control signal D1 may be flipped from the supply voltage VDD to the ground voltage VSS, and the control signal ZD1 may be flipped from the ground voltage VSS to the supply voltage VDD, turning off the P-type transistor M872 and turning on the N-type transistor M874, thereby disabling the second inverter in the feedback path of the latch.

The detection circuits 82 may include a second NDET detection cell, the second NDET detection cell including a P-type transistor M821, N-type transistors M822 and M823, a reset transistor M824, and an inverter 820. The P-type transistor M821 includes a control terminal configured to receive the ground voltage VSS, a first terminal configured to receive the supply voltage VDD, and a second terminal. The N-type transistor M822 includes a control terminal configured to receive a control signal D, a first terminal coupled to the second terminal of the P-type transistor M821, and a second terminal coupled to the control terminal of the N-type transistor M822. The N-type transistor M823 includes a control terminal coupled to the control terminal of the P-type transistor M821, a first terminal coupled to the second terminal of the N-type transistor M822, and a second terminal configured to receive ground voltage VSS, the N-type transistor M823 being arranged at the distance less than the laser spot diameter from the N-type transistor M875. The inverter 820 includes an input terminal coupled to the second terminal of the N-type transistor M822, and an output terminal coupled to the control terminal of the P-type transistor M861 and the control terminal of the N-type transistor M864.

Since the N-type transistor M823 is arranged at the distance less than the laser spot diameter from the N-type transistor M875, an LFI targeting the N-type transistor M875 may be detected by the N-type transistor M823 flipping the control signal D prior to N-type transistor M875 flipping the data signal DAT. Upon detecting the LFI, the control signal D may be flipped from the supply voltage VDD to the ground voltage VSS, and the control signal ZD may be flipped from the ground voltage VSS to the supply voltage VDD, turning off the P-type transistor M861 and turning on the N-type transistor M863, thereby disabling the first inverter in the forward path of the latch.

The pulse generator 84 includes an input terminal configured to receive the clock signal CLK, and an output terminal coupled to the control terminal of the reset transistor 814 and the control terminal of the reset transistor 824, and configured to generate a reset pulse ZRST to the control terminal of the reset transistor 814 and the control terminal of the reset transistor 824 upon a first transition of the clock signal CLK. The first transition may be a falling edge. The reset pulse ZRST may be a low-active signal having a predetermined length, and may be used to reset the detection circuits 81 and 82. The reset transistor M814 includes a control terminal configured to receive the reset pulse ZRST, a first terminal configured to receive the supply voltage VDD, and a second terminal coupled to the second terminal of the N-type transistor M812. During a reset, the reset transistor M814 may be turned on by the reset pulse ZRST to pull the control signal D1 to the supply voltage VDD, thereby resetting the detection circuit 81. The reset transistor M824 includes a control terminal configured to receive the reset pulse ZRST, a first terminal configured to receive the supply voltage VDD, and a second terminal coupled to the second terminal of the N-type transistor M822. During the reset, the reset transistor M824 may be turned on by the reset pulse ZRST to pull the control signal D to the supply voltage VDD, thereby resetting the detection circuit 82.

The fault-injection protection circuit further includes an OR gate 83 including a first input terminal coupled to the output terminal of the inverter 810, a second input terminal coupled to the output terminal of the inverter 820, and an output terminal configured to generate an alarm signal ALARM. The alarm signal ALARM may be used to disable other components in the circuit under protection 80 upon detecting the LFI.

Figure 9:
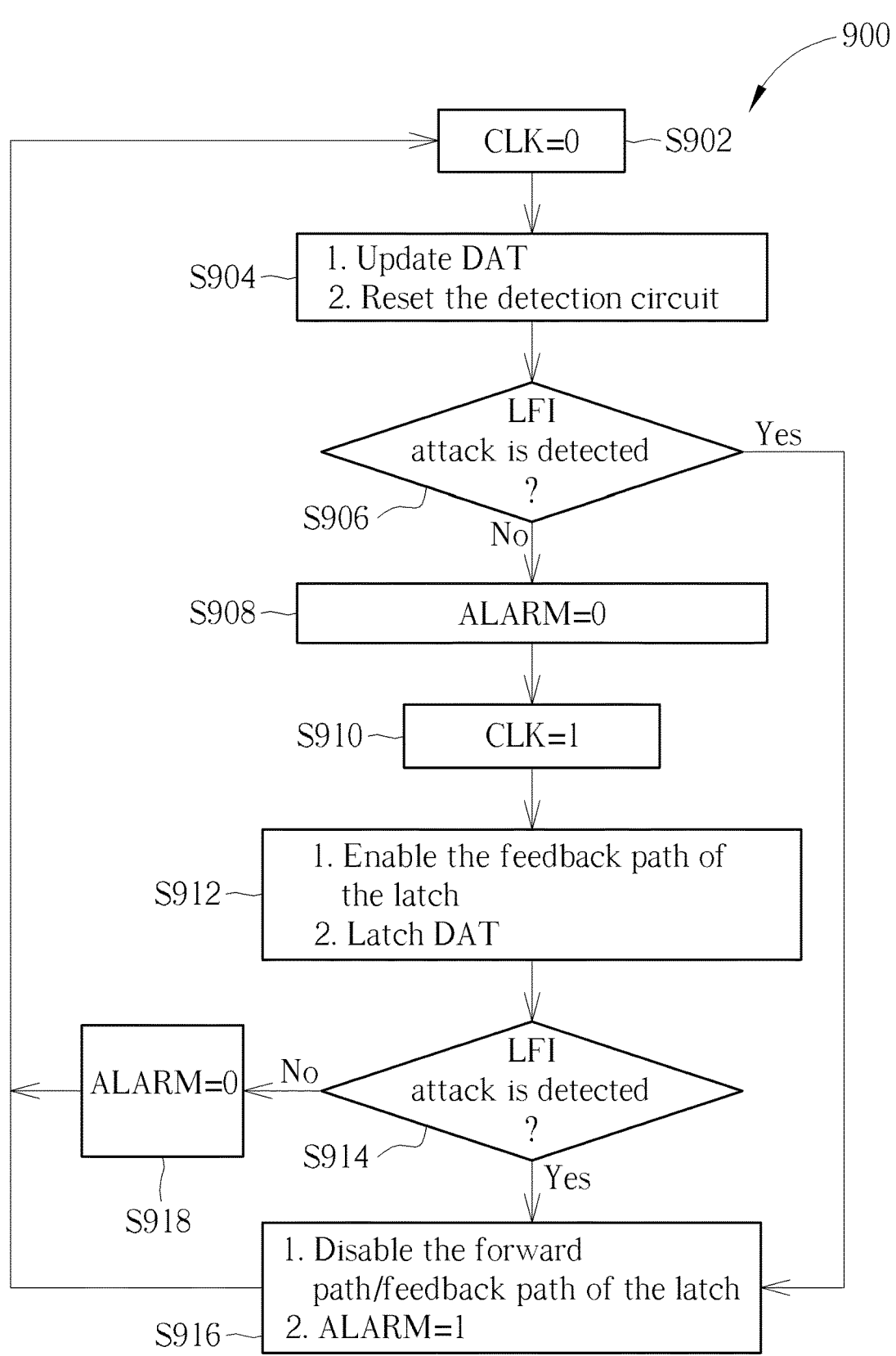
FIG. 9 is a flowchart of a control method of the fault-injection protection circuit in FIG. 8.

FIG. 9 is a flowchart of a control method 900 of the fault-injection protection circuit 8. The control method 800 includes Steps S902 to S918 to control the circuit under protection 80 according to LFI detection. Any reasonable step change or adjustment is within the scope of the present disclosure. Steps S902 to S918 are detailed as follows:

Step S902: Set the clock signal CLK to the logical level "0";

Step S904: The pass gate 85 updates the data signal DAT, and the pulse generator 84 resets the detection circuits 81 and 82;

Step S906: The detection circuits 81 and 82 determine whether an LFI attack is detected? If so, go to Step S916; if not, go to Step S908;

Step S908: Set the alarm signal ALARM to the logical level "0";

Step S910: Set the clock signal CLK to the logical level "1";

Step S912: Enable the feedback path of the latch, and latch the data signal DAT;

Step S914: The detection circuits 81 and 82 determine whether an LFI attack is detected? If so, go to Step S916; if not, go to Step S918;

Step S916: Disable the forward path/feedback path of the latch, and set the alarm signal ALARM to the logical level "1";

Step S918: Set the alarm signal ALARM to the logical level "0".

In Step S904, the pass gate 85 passes the input signal IN to update the data signal DAT. In Step S912, the data signal DAT is latched by enabling the feedback path of the latch.

In Step S906, if an LFI attack is detected by the detection circuits 82 during the clock signal CLK is at the logical level "0", then in Step 916, the forward path of the latch is disabled. In Step S914, if an LFI attack is detected by the detection circuits 81 during the clock signal CLK is at the logical level "1", then in Step 916, the feedback path of the latch is disabled. The other Steps in the control method 900 are discussed in the preceding paragraphs and will not be here for brevity.

Figure 10:
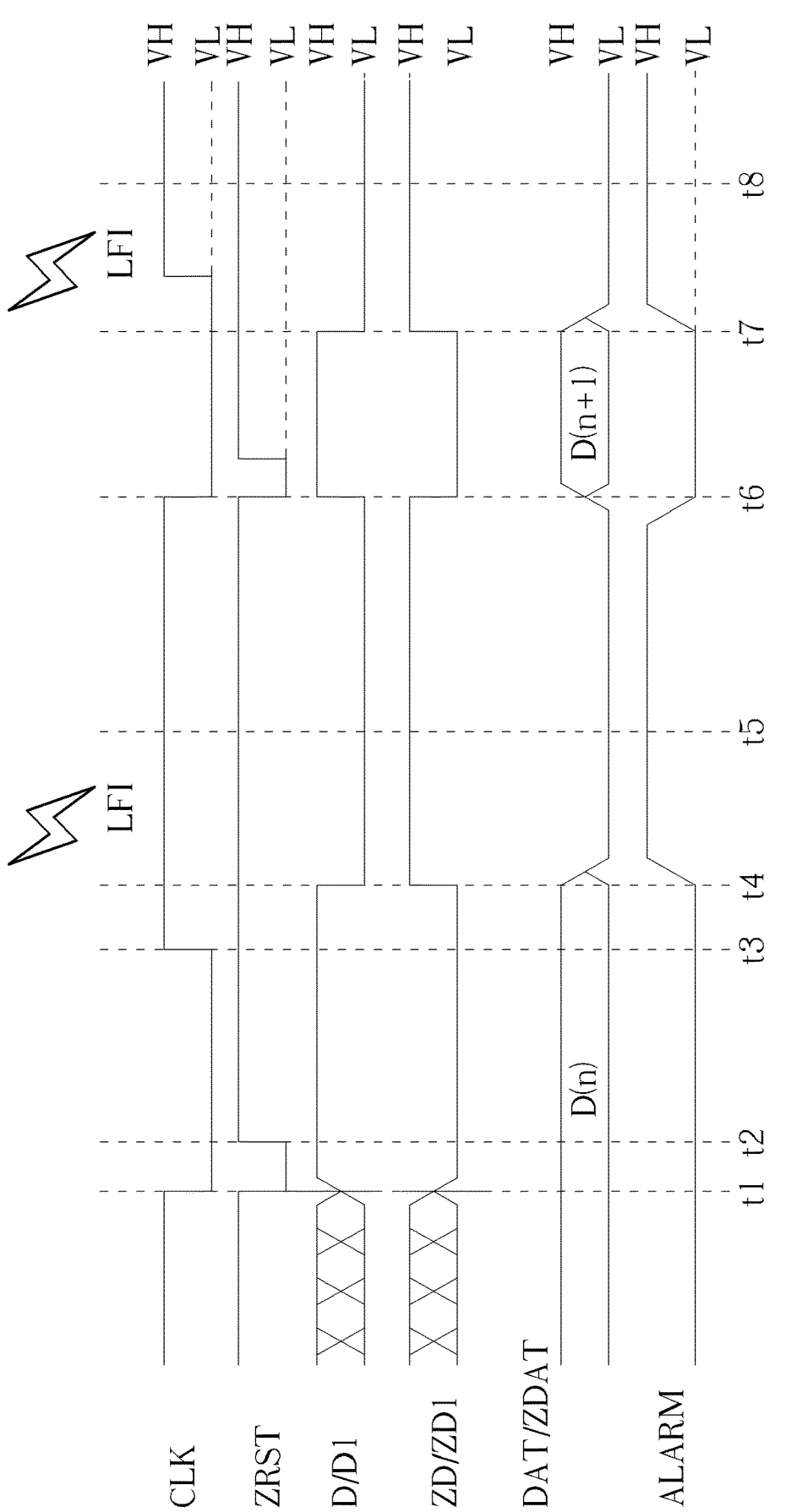
FIG. 10 is a timing diagram of the fault-injection protection circuit in FIG. 8.

FIG. 10 is a timing diagram of the fault-injection protection circuit 8, where the horizontal axis represents time, and the vertical axis represents voltage.

At Time t1, the clock signal CLK is set to a low voltage VL, a reset pulse ZRST starts, pulling up the control signals D/D1 to a high voltage VH while pulling down the control signals ZD/ZD1 to the low voltage VL, the signals DAT/ZDAT are updated according to data D(n), and the alarm signal ALARM remains at the low voltage VL.

At Time t2, the clock signal CLK remains at the low voltage VL, the reset pulse ZRST ends, the control signals D/D1 remain at the high voltage VH while the control signals ZD/ZD1 remaining at the low voltage VL, the signals DAT/ZDAT remains unchanged, and the alarm signal ALARM remains at the low voltage VL.

At Time t3, the clock signal CLK is set to the high voltage VH, the reset pulse ZRST remains at the high voltage VH, the control signals D/D1 remain at the high voltage VH while the control signals ZD/ZD1 remaining at the low voltage VL, the signals DAT/ZDAT are latched, and the alarm signal ALARM remains at the low voltage VL.

At Time t4, an LFI attack starts, the clock signal CLK remains at the high voltage VH, the reset pulse ZRST remains at the high voltage VH, the control signals D/D1 flip to the low voltage VL while the control signals ZD/ZD1 flipping to the high voltage VH, the signals DAT/ZDAT are disabled, and the alarm signal ALARM is set to the high voltage VH.

At Time t5, the LFI attack ends, the clock signal CLK remains at the high voltage VH, the reset pulse ZRST remains at the high voltage VH, the control signals D/D1 remain at the low voltage VL while the control signals ZD/ZD1 remain at the high voltage VH, the signals DAT/ZDAT are disabled, and the alarm signal ALARM remains at the high voltage VH.

At Time t6, the clock signal CLK is set to a low voltage VL, another reset pulse ZRST starts, pulling up the control signals D/D1 to a high voltage VH while pulling down the control signals ZD/ZD1 to the low voltage VL, the signals DAT/ZDAT are updated according to data D(n+1), and the alarm signal ALARM is set to the low voltage VL.

At Time t7, another LFI attack starts, the clock signal CLK remains at the low voltage VL, the reset pulse ZRST remains at the high voltage VH, the control signals D/D1 flip to the low voltage VL while the control signals ZD/ZD1 flip to the high voltage VH, the signals DAT/ZDAT are disabled, and the alarm signal ALARM is set to the high voltage VH.

At Time t8, the LFI attack ends, the clock signal CLK is at the high voltage VH, the reset pulse ZRST remains at the high voltage VH, the control signals D/D1 remain at the low voltage VL while the control signals ZD/ZD1 remain at the high voltage VH, the signals DAT/ZDAT are disabled, and the alarm signal ALARM remains at the high voltage VH.

The embodiments in FIGS. 2 to 10 arrange the detection circuit closely to the circuit under protection to detect the LFI and disable the circuit under protection upon LFI detection, preventing unauthorized user to access secure data and enhancing the data security.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fault-injection protection circuit comprising:
a circuit under protection; and
a first detection circuit configured to generate an alarm signal upon detecting a laser fault injection, and comprising:
    a first detection cell having unequal first pull-up capability and first pull-down capability, arranged at a distance less than a laser spot diameter from the circuit under protection, and comprising:
        an input terminal configured to receive a supply voltage or a ground voltage, and
        an output terminal;
    a second detection cell having unequal second pull-up capability and second pull-down capability, arranged at a distance less than the laser spot diameter from the circuit under protection, and comprising:
        an input terminal coupled to the output terminal of the first detection cell, and
        an output terminal.

2. The fault-injection protection circuit of claim 1, wherein:
the first detection cell comprises:
    a plurality of stacked P-type transistors comprising a plurality of control terminals, a first terminal configured to receive the supply voltage, and a second terminal; and
    an N-type transistor comprising a control terminal coupled to the plurality of control terminals of the plurality of stacked P-type transistors, a first terminal coupled to the second terminal of the plurality of stacked P-type transistors, and a second terminal configured to receive the ground voltage; and
the first pull-up capability is less than the first pull-down capability.

3. The fault-injection protection circuit of claim 1, wherein:
the first detection cell comprises:
    a first P-type transistor comprising a control terminal, a first terminal configured to receive the supply voltage, and a second terminal;
    a second P-type transistor comprising a control terminal, a first terminal coupled to the second terminal of the first P-type transistor and the control terminal of the second P-type transistor, and a second terminal; and an N-type transistor comprising a control terminal coupled to the control terminal of the first P-type transistor, a first terminal coupled to the second terminal of the second P-type transistor, and a second terminal configured to receive the ground voltage; and the first pull-down capability is less than the first pull-up capability.

4. The fault-injection protection circuit of claim 1, wherein:

the first detection cell comprises:

a P-type transistor comprising a control terminal, a first terminal configured to receive the supply voltage, and a second terminal; and a plurality of stacked N-type transistors comprising a plurality of control terminals coupled to the control terminal of the P-type transistor, a first terminal coupled to the second terminal of the P-type transistor, and a second terminal configured to receive the ground voltage; and the first pull-up capability exceeds the first pull-down capability.

5. The fault-injection protection circuit of claim 1, wherein:

the first detection cell comprises:

a P-type transistor comprising a control terminal, a first terminal configured to receive the supply voltage, and a second terminal;

a first N-type transistor comprising a control terminal, a first terminal coupled to the second terminal of the P-type transistor, and a second terminal coupled to the control terminal of the first N-type transistor; and a second N-type transistor comprising a control terminal coupled to the control terminal of the P-type transistor, a first terminal coupled to the second terminal of the first N-type transistor, and a second terminal configured to receive the ground voltage; and the first pull-up capability exceeds the first pull-down capability.

6. The fault-injection protection circuit of claim 1, wherein:

the first detection cell comprises an input terminal configured to receive the supply voltage, and an output terminal;

the second detection cell comprises an input terminal coupled to the output terminal of the first detection cell, and an output terminal;

the first pull-up capability exceeds the first pull-down capability; and the second pull-up capability is less than the second pull-down capability.

7. The fault-injection protection circuit of claim 1, wherein:

the first detection cell comprises an input terminal configured to receive the ground voltage, and an output terminal;

the second detection cell comprises an input terminal coupled to the output terminal of the first detection cell, and an output terminal;

the first pull-up capability is less than the first pull-down capability; and the second pull-up capability exceeds the second pull-down capability.

8. A fault-injection protection circuit comprising:

a circuit under protection comprising a latch, the latch comprising:

a first inverter comprising an input terminal and an output terminal; and a second inverter comprising an input terminal coupled to the output terminal of the first inverter, and an output terminal coupled to the input terminal of the first inverter;

a first detection circuit configured to generate an alarm signal upon detecting a laser fault injection, arranged at the distance less than a laser spot diameter from the first inverter, configured to disable the second inverter upon detecting the laser fault injection, and comprising:

a first detection cell having unequal first pull-up capability and first pull-down capability, arranged at a distance less than the laser spot diameter from the circuit under protection; and a second detection circuit comprising:

a second detection cell having unequal second pull-up capability and second pull-down capability, arranged at a distance less than the laser spot diameter from the second inverter, and configured to disable the first inverter upon detecting another laser fault injection.

9. The fault-injection protection circuit of claim 8, wherein:

the first detection circuit further comprises:

a third detection cell having unequal third pull-up capability and third pull-down capability, arranged at a distance less than the laser spot diameter from the first inverter; and a third inverter having equal pull-up capability and pull-down capability;

the first detection cell comprises an input terminal configured to receive a ground voltage, and an output terminal;

the third detection cell comprises an input terminal coupled to the output terminal of the first detection cell, and an output terminal coupled to a second enable terminal of the second inverter;

the third inverter comprises an input terminal coupled to the output terminal of the third detection cell, and an output terminal coupled to a first enable terminal of the second inverter;

the second detection circuit further comprises:

a fourth detection cell having unequal fourth pull-up capability and fourth pull-down capability, arranged at a distance less than the laser spot diameter from the second inverter; and a fourth inverter having equal pull-up capability and pull-down capability;

the second detection cell comprises an input terminal configured to receive the ground voltage, and an output terminal;

the fourth detection cell comprises an input terminal coupled to the output terminal of the second detection cell, and an output terminal coupled to a second enable terminal of the first inverter; and the fourth inverter comprises an input terminal coupled to the output terminal of the fourth detection cell, and an output terminal coupled to a first enable terminal of the first inverter.

10. The fault-injection protection circuit of claim 9, wherein:

the first pull-up capability exceeds the first pull-down capability;

the third pull-up capability is less than the third pull-down capability;

the second pull-up capability exceeds the second pull-down capability; and the fourth pull-up capability is less than the fourth pull-down capability.

11. The fault-injection protection circuit of claim 8, wherein:

the first inverter comprises:

a first P-type transistor comprising a control terminal, a first terminal configured to receive a supply voltage, and a second terminal;

a second P-type transistor comprising a control terminal, a first terminal coupled to the second terminal of the first P-type transistor, and a second terminal;

a first N-type transistor comprising a control terminal coupled to the control terminal of the second P-type transistor, a first terminal coupled to the second terminal of the second P-type transistor, and a second terminal configured to receive a ground voltage; and a second N-type transistor comprising a control terminal, a first terminal coupled to the first terminal of the first N-type transistor, and a second terminal coupled to the second terminal of the first N-type transistor;

the second inverter comprises:

a third P-type transistor comprising a control terminal, a first terminal configured to receive the supply voltage, and a second terminal;

a fourth P-type transistor comprising a control terminal, a first terminal coupled to the second terminal of the third P-type transistor, and a second terminal;

a fifth P-type transistor comprising a control terminal, a first terminal coupled to the second terminal of the fourth P-type transistor, and a second terminal;

a third N-type transistor comprising a control terminal coupled to the control terminal of the fifth P-type transistor, a first terminal coupled to the second terminal of the fifth P-type transistor, and a second terminal;

a fourth N-type transistor comprising a control terminal, a first terminal coupled to the first terminal of the third N-type transistor, and a second terminal coupled to the second terminal of the third N-type transistor; and a fifth N-type transistor comprising a control terminal, a first terminal coupled to the second terminal of the third N-type transistor, and a second terminal configured to receive the ground voltage;

the first detection cell comprises:

a sixth P-type transistor comprising a control terminal, a first terminal configured to receive the supply voltage, and a second terminal;

a sixth N-type transistor comprising a control terminal, a first terminal coupled to the second terminal of the sixth P-type transistor, and a second terminal coupled to the control terminal of the sixth N-type transistor;

a seventh N-type transistor comprising a control terminal coupled to the control terminal of the sixth P-type transistor, a first terminal coupled to the second terminal of the sixth N-type transistor, and a second terminal configured to receive the ground voltage, the seventh N-type transistor being arranged at the distance less than the laser spot diameter from the first N-type transistor;

a first reset transistor comprising a control terminal, a first terminal configured to receive the supply voltage, and a second terminal coupled to the second terminal of the sixth N-type transistor; and a third inverter comprising an input terminal coupled to the second terminal of the sixth N-type transistor, and an output terminal coupled to the control terminal of the fourth P-type transistor and the control terminal of the fourth N-type transistor; and the second detection cell comprises:

a seventh P-type transistor comprising a control terminal, a first terminal configured to receive the supply voltage, and a second terminal;

an eighth N-type transistor comprising a control terminal, a first terminal coupled to the second terminal of the seventh P-type transistor, and a second terminal coupled to the control terminal of the eighth N-type transistor;

a ninth N-type transistor comprising a control terminal coupled to the control terminal of the seventh P-type transistor, a first terminal coupled to the second terminal of the eighth N-type transistor, and a second terminal configured to receive the ground voltage, the ninth N-type transistor being arranged at the distance less than the laser spot diameter from the third N-type transistor;

a second reset transistor comprising a control terminal, a first terminal configured to receive the supply voltage, and a second terminal coupled to the second terminal of the eighth N-type transistor; and a fourth inverter comprising an input terminal coupled to the second terminal of the eighth N-type transistor, and an output terminal coupled to the control terminal of the first P-type transistor and the control terminal of the second N-type transistor.

12. The fault-injection protection circuit of claim 11, further comprising a pulse generator comprising an input terminal configured to receive a clock signal, and an output terminal coupled to the control terminal of the first reset transistor and the control terminal of the second reset transistor, and configured to generate a reset pulse to the control terminal of the first reset transistor and the control terminal of the second reset transistor upon a first transition of the clock signal.

13. The fault-injection protection circuit of claim 11, further comprising an OR gate comprising a first input terminal coupled to the output terminal of the third inverter, a second input terminal coupled to the output terminal of the fourth inverter, and an output terminal.

14. A fault-injection protection circuit comprising:

a circuit under protection comprising a sense amplifier;

a first detection circuit configured to generate an alarm signal upon detecting a laser fault injection, and comprising:

a first detection cell having unequal first pull-up capability and first pull-down capability, arranged at a distance less than a laser spot diameter from the circuit under protection, and comprising an input terminal configured to receive a supply voltage, and an output terminal; and a second detection cell having unequal second pull-up capability and second pull-down capability, arranged at a distance less than the laser spot diameter from the circuit under protection, and comprising an input terminal coupled to the output terminal of the first detection cell, and an output terminal;

a second detection circuit comprising:

a third detection cell having unequal third pull-up capability and third pull-down capability, arranged at a distance less than the laser spot diameter from the circuit under protection, and comprises an input terminal configured to receive a ground voltage, and an output terminal; and a fourth detection cell having unequal fourth pull-up capability and fourth pull-down capability, arranged at a distance less than the laser spot diameter from the circuit under protection, and comprises an input terminal coupled to the output terminal of the third detection cell, and an output terminal;

a first inverter comprising an input terminal coupled to the output terminal of the second detection cell, and an output terminal; and an OR gate comprising a first input terminal coupled to the output terminal of the first inverter, a second input terminal coupled to the output terminal of the fourth detection cell, and an output terminal coupled to a control terminal of the sense amplifier.

15. The fault-injection protection circuit of claim 14, wherein the fault-injection protection circuit further comprises:

a third detection circuit comprising:

a fifth detection cell having unequal fifth pull-up capability and fifth pull-down capability, arranged at a distance less than the laser spot diameter from the circuit under protection, and comprises an input terminal configured to receive the ground voltage, and an output terminal; and a sixth detection cell having unequal sixth pull-up capability and sixth pull-down capability, arranged at a distance less than the laser spot diameter from the circuit under protection, and comprises an input terminal coupled to the output terminal of the fifth detection cell, and an output terminal;

a fourth detection circuit comprising:

a seventh detection cell having unequal seventh pull-up capability and seventh pull-down capability, arranged at a distance less than the laser spot diameter from the circuit under protection, and comprises an input terminal configured to receive the supply voltage, and an output terminal; and an eighth detection cell having unequal eighth pull-up capability and eighth pull-down capability, arranged at a distance less than the laser spot diameter from the circuit under protection, and comprises an input terminal coupled to the output terminal of the seventh detection cell, and an output terminal; and a second inverter comprising an input terminal coupled to the output terminal of the eighth detection cell, and an output terminal; and the OR gate further comprises a third input terminal coupled to the output terminal of the sixth detection cell, and a fourth input terminal coupled to the output terminal of the second inverter.

16. The fault-injection protection circuit of claim 15, wherein:

the first detection circuit and the second detection circuit are arranged at the left of the sense amplifier; and the third detection circuit and the fourth detection circuit are arranged at the right of the sense amplifier.

17. The fault-injection protection circuit of claim 15, wherein:

the first pull-up capability exceeds the first pull-down capability;

the second pull-up capability is less than the second pull-down capability;

the third pull-up capability is less than the third pull-down capability;

the fourth pull-up capability exceeds the fourth pull-down capability;

the fifth pull-up capability is less than the fifth pull-down capability;

the sixth pull-up capability exceeds the sixth pull-down capability;

the seventh pull-up capability exceeds the seventh pull-down capability; and the eighth pull-up capability is less than the eighth pull-down capability.

* * * * *